(12) United States Patent
Yun et al.

(10) Patent No.: US 7,940,369 B2
(45) Date of Patent: *May 10, 2011

(54) STEREOSCOPIC IMAGE CONVERSION PANEL AND STEREOSCOPIC IMAGE DISPLAY APPARATUS WITH LIQUID CRYSTAL LENS HAVING PERIODICALLY FLUCTUATING LOWER VOLTAGE APPLIED TO LOWER PARALLEL ELECTRODES AND SAME VOLTAGE APPLIED TO UPPER PARALLEL ELECTRODES PERPENDICULAR TO LOWER ELECTRODES

(75) Inventors: Hae-Young Yun, Suwon-si (KR);
Won-Sang Park, Yongin-si (KR);
Seung-Kyu Lee, Suwon-si (KR);
Seon-Hong Ahn, Suwon-si (KR);
Sang-Woo Kim, Suwon-si (KR);
Chang-Woo Shim, Seoul (KR);
Yong-Suk Yeo, Jecheon-si (KR);
Jae-Young Lee, Seoul (KR); Jae-Ik Lim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/748,889

(22) Filed: Mar. 29, 2010

(65) Prior Publication Data

US 2010/0182520 A1 Jul. 22, 2010

Related U.S. Application Data

(63) Continuation of application No. 11/624,056, filed on Jan. 17, 2007, now Pat. No. 7,697,109.

(30) Foreign Application Priority Data

Feb. 20, 2006 (KR) .................. 10-2006-0016059

(51) Int. Cl.
*G02F 1/13* (2006.01)
*G02F 1/1335* (2006.01)
(52) U.S. Cl. .......................... 349/200; 349/15
(58) Field of Classification Search .................. 349/15, 349/139–147, 200–202; 348/51–60
See application file for complete search history.

(56) References Cited

U.S. PATENT DOCUMENTS

| 4,493,531 A | 1/1985 | Bohmer et al. |
| 5,493,427 A * | 2/1996 | Nomura et al. .................. 349/5 |
| 6,714,174 B2 | 3/2004 | Suyama et al. |
| 2006/0146208 A1 * | 7/2006 | Kim .............................. 349/15 |

* cited by examiner

*Primary Examiner* — David Nelms
*Assistant Examiner* — David Y Chung
(74) *Attorney, Agent, or Firm* — Cantor Colburn LLP

(57) ABSTRACT

In a stereoscopic image conversion panel for enhancing display quality and a stereoscopic image display apparatus having the panel, the stereoscopic display panel includes lower and upper transparent substrates, lower and upper transparent electrodes, and a liquid crystal lens layer. The lower and upper transparent substrates face each other. The lower transparent electrodes are disposed on the lower transparent substrate, formed along a first direction, and formed substantially in parallel with each other along a second direction. The upper transparent electrodes are disposed on the upper transparent substrate, formed along the second direction, and formed substantially in parallel with each other along the first direction. The liquid crystal lens layer is disposed between the upper and lower transparent substrates, and a longitudinal arrangement direction of liquid crystal molecules of the liquid crystal lens layer is changed by an electric field to have a predetermined refractive index. Therefore, a refracted incident light produces a stereoscopic image for enhancing display quality.

13 Claims, 12 Drawing Sheets

STEREOSCOPIC IMAGE CONVERSION PANEL AND STEREOSCOPIC IMAGE DISPLAY APPARATUS WITH LIQUID CRYSTAL LENS HAVING PERIODICALLY FLUCTUATING LOWER VOLTAGE APPLIED TO LOWER PARALLEL ELECTRODES AND SAME VOLTAGE APPLIED TO UPPER PARALLEL ELECTRODES PERPENDICULAR TO LOWER ELECTRODES

The present application is a continuation application of U.S. application Ser. No. 11/624,056, filed on Jan. 17, 2007, which claims priority to Korean Patent Application No. 2006-16059, filed on Feb. 20, 2006, and all the benefits accruing therefrom under 35 U.S.C. §119, the contents of which in its entirety are herein incorporated by reference.

BACKGROUND OF THE INVENTION

1. Field of the Invention

The present invention relates to a stereoscopic image conversion panel and a stereoscopic image display apparatus having the stereoscopic image conversion panel. More particularly, the present invention relates to a stereoscopic image conversion panel for enhancing image display quality and a stereoscopic image display apparatus having the stereoscopic image conversion panel.

2. Description of the Related Art

Nowadays, stereoscopic image display apparatuses to display a three-dimensional ("3-D") stereoscopic image are being developed according to an increase in demand for 3-D stereoscopic images in the fields of games, movies and so on.

Generally, the stereoscopic image display apparatus applies two-dimensional ("2-D") flat images different from each other to a viewer's eyes to display the 3-D stereoscopic image. For example, a viewer may watch a pair of 2-D flat images with one image being displayed to each eye, and then the brain merges the pair of 2-D flat images for the viewer to sense the stereoscopic image.

Stereoscopic image display apparatuses may be classified as either a stereoscopic type or an auto stereoscopic type according to whether or not the viewer is required to wear glasses for viewing the stereoscopic image. The stereoscopic type includes a polarizing type, a time divisional type, and so on. The auto stereoscopic type includes a parallax-barrier type, a lenticular type, a blinking light type, and so on.

Generally, since glasses are not typically required to use a flat display apparatus, the stereoscopic image display apparatus without requiring the extra glasses, such as the parallax-barrier type, the lenticular type and so on, is usually used.

In the parallax-barrier type, a light emitted from a left pixel and a right pixel is blocked or transmitted using a time-delay barrier to control a viewing angle, so that a stereoscopic image is displayed. In the lenticular type, the light emitted from the left pixel and the right pixel is refracted using a concave lens to control the viewing angle, so that the stereoscopic image is displayed.

However, in the parallax-barrier type, since the light is partially blocked, the brightness can be reduced by about 50%. In the lenticular type, since a concave lens is used, forming an alignment groove on an alignment film formed on the concave lens is difficult.

Therefore, when the parallax-barrier type or the lenticular type of stereoscopic image display apparatus is employed without using the extra glasses, the brightness and alignment properties are reduced, thus reducing the image display quality.

BRIEF SUMMARY OF THE INVENTION

The present invention provides a stereoscopic image conversion panel enhancing image display quality to increase brightness and alignment properties.

The present invention also provides a stereoscopic image display apparatus having the stereoscopic image conversion panel.

In an exemplary embodiment of a stereoscopic image conversion panel according to the present invention, the stereoscopic image conversion panel includes a lower transparent substrate, an upper transparent substrate, lower transparent electrodes, upper transparent electrodes and a liquid crystal lens layer.

The lower and upper transparent substrates are disposed facing each other. The lower transparent electrodes are disposed on the lower transparent substrate facing the upper transparent substrate, are formed lengthwise along a first direction, and are formed substantially in parallel with each other along a second direction perpendicular to the first direction. The upper transparent electrodes are disposed on the upper transparent substrate facing the lower transparent substrate, are formed lengthwise along the second direction, and are formed substantially in parallel with each other along the first direction. The liquid crystal lens layer is disposed between the upper and lower transparent substrates, the liquid crystal lens layer includes liquid crystal molecules having an anisotropic refractive index, and a longitudinal arrangement direction of liquid crystal molecules is changed by an electric field generated between the upper and lower transparent electrodes, the electric field changing the refractive index according to a position of the liquid crystal molecules.

Lower voltages which periodically fluctuate along the second direction may be applied to the lower transparent electrodes. Substantially the same upper voltages may be applied to the upper transparent electrodes. However, the upper voltages which periodically fluctuate along the first direction, may be applied to the upper transparent electrodes, and substantially the same lower voltages may be applied to the lower transparent electrodes.

In another exemplary embodiment of a stereoscopic image display apparatus according to the present invention, the stereoscopic image display apparatus includes a backlight assembly emitting a light, a display panel assembly being disposed over the backlight assembly and displaying a flat image using the light, and a stereoscopic image conversion panel disposed over the display panel assembly.

The stereoscopic image conversion panel includes a lower transparent substrate; an upper transparent substrate facing the lower transparent substrate; lower transparent electrodes disposed on the lower transparent substrate facing the upper transparent substrate, formed lengthwise along a first direction, and formed substantially in parallel with each other along a second direction perpendicular to the first direction; upper transparent electrodes disposed on the upper transparent substrate facing the lower transparent substrate, formed lengthwise along the second direction, and formed substantially in parallel with each other along the first direction; and a liquid crystal lens layer disposed between the upper and lower transparent substrates, the liquid crystal lens layer including liquid crystal molecules having an anisotropic refractive index, and a longitudinal arrangement direction of liquid crystal molecules being changed by an electric field generated between the upper and lower transparent electrodes, the electric field changing the refractive index according to a position of the liquid crystal molecules and to selectively convert the flat image into a stereoscopic image.

Therefore, since the stereoscopic image lens part is rearranged by an electric field generated between the upper and lower transparent electrodes and a refractive index is changed according to the position, a stereoscopic image can be produced by refracting light polarized to have a predetermined direction, and thus a display quality of the stereoscopic image display apparatus may be enhanced.

BRIEF DESCRIPTION OF THE DRAWINGS

The above and other aspects, features and advantages of the present invention will become more apparent by describing in more detail exemplary embodiments thereof with reference to the accompanying drawings, in which.

DETAILED DESCRIPTION OF THE INVENTION

Figure 1:
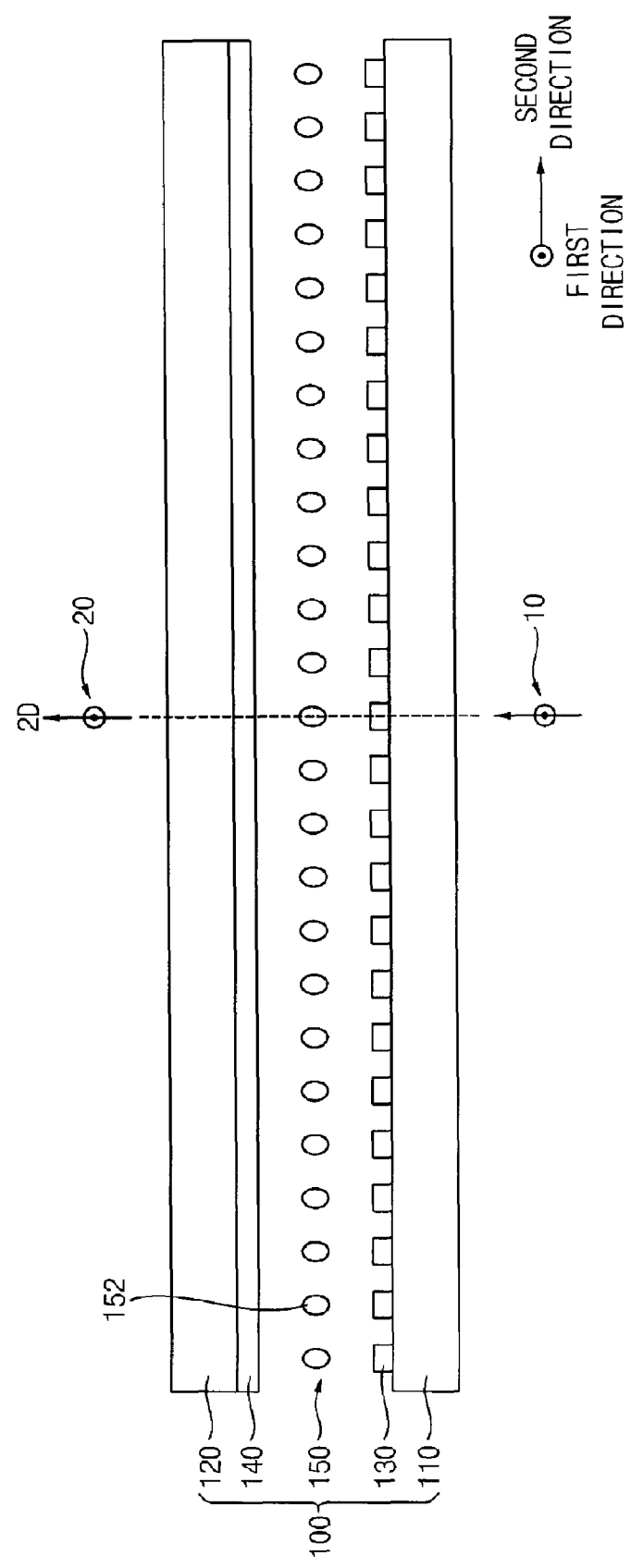
FIG. 1 is a cross-sectional view illustrating a stereoscopic image conversion panel according to a first exemplary embodiment of the present invention.

The present invention is described more fully hereinafter with reference to the accompanying drawings, in which exemplary embodiments of the present invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the present invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in more detail with reference to the accompanying drawings.

Example Embodiment 1

Stereoscopic Image Conversion Panel

Figure 2:
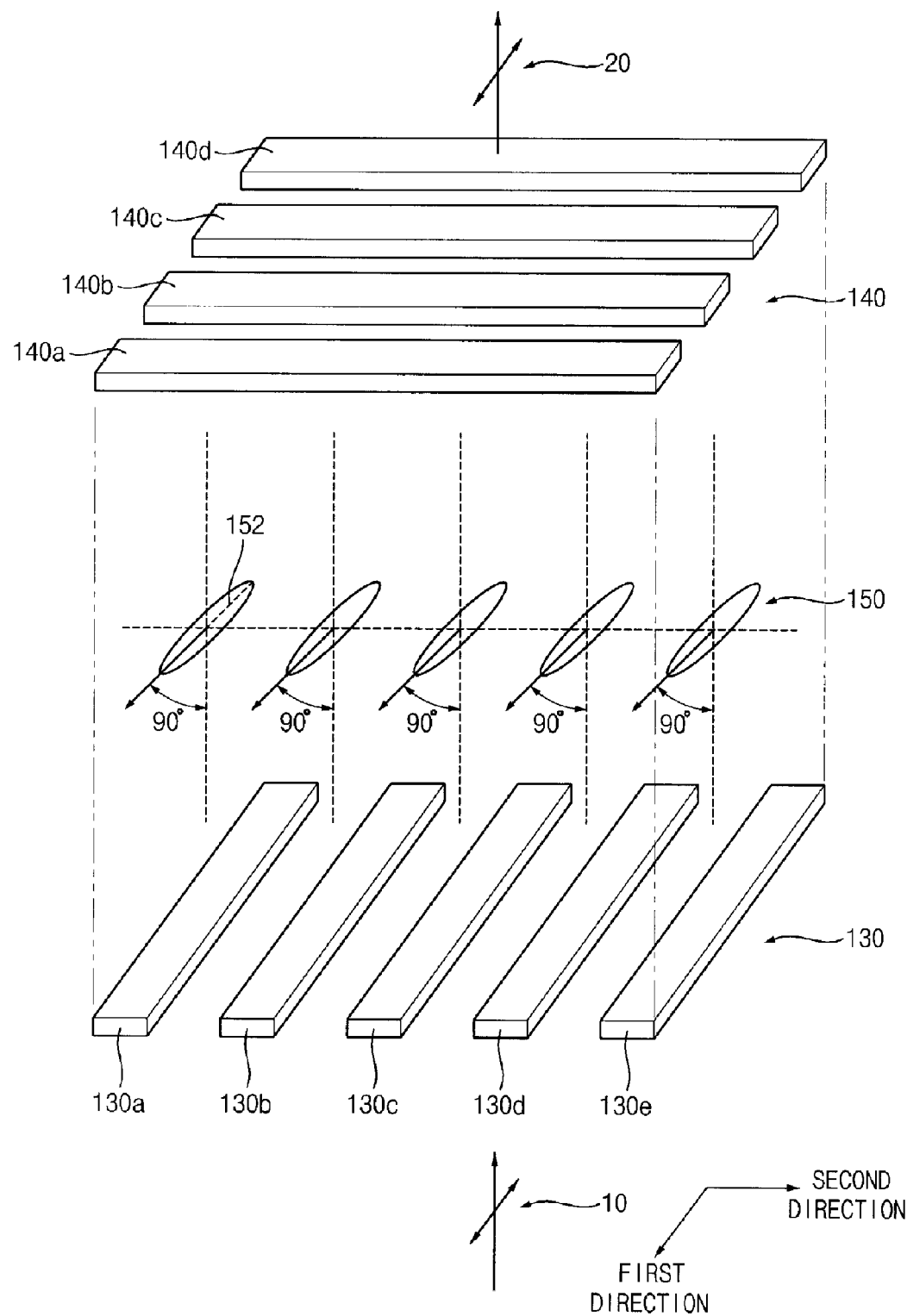
FIG. 2 is an enlarged perspective partial view illustrating the stereoscopic image conversion panel in FIG. 1.

FIG. 1 is a cross-sectional view illustrating a stereoscopic image conversion panel according to a first exemplary embodiment of the present invention, and FIG. 2 is an enlarged perspective partial view illustrating the stereoscopic image conversion panel in FIG. 1.

Referring to FIGS. 1 and 2, the stereoscopic image conversion panel 100 according to the first exemplary embodiment includes a lower transparent substrate 110, an upper transparent substrate 120, lower transparent electrodes 130, upper transparent electrodes 140 and a liquid crystal lens layer 150. The stereoscopic image conversion panel 100 displays a flat image applied from a lower part, or converts the flat image into a stereoscopic image to display the stereoscopic image.

The lower transparent substrate 110 has a plate-like shape and includes, for example, transparent glass, quartz or synthetic resins. The upper transparent substrate 120 also has a plate-like shape and includes, for example, transparent glass, quartz or synthetic resins. The upper transparent substrate 120 is disposed facing the lower transparent substrate 110.

The lower transparent electrodes 130 are formed on the lower transparent substrate 110 facing the upper transparent substrate 120. The lower transparent electrodes 130 are formed lengthwise along a first direction, and are formed substantially in parallel with each other along a second direction substantially perpendicular to the first direction. For example referring to FIG. 2, a first lower transparent electrode 130a, a second lower transparent electrode 130b, a third lower transparent electrode 130c, a fourth lower transparent electrode 130d and a fifth lower transparent electrode 130e are illustrated.

The lower transparent electrodes 130 are separated from each other in a range of between about 1 μm to about 10 μm, and preferably about 5 μm. A width of the lower transparent electrodes 130 is in a range between about 1 μm to about 10 μm, and about 4 μm in exemplary embodiments.

Each lower transparent electrode 130 is formed of a transparent conductive material. An example of a material that may be used for the lower transparent electrode 130 may include indium tin oxide ("ITO"), indium zinc oxide ("IZO"), amorphous indium tin oxide ("a-ITO"), for example, but is not limited thereto. The lower transparent electrodes 130 are electrically connected to a power supply part (not shown) and a lower voltage is applied to the lower transparent electrodes 130.

The upper transparent electrodes 140 are formed on the upper transparent substrate 120 facing the lower transparent substrate 110. The upper transparent electrodes 140 are formed lengthwise along the second direction to cross the lower transparent electrodes 130, and are formed substantially in parallel with each other along the first direction. For example referring to FIG. 2, a first upper transparent electrode 140a, a second upper transparent electrode 140b, a third upper transparent electrode 140c and a fourth upper transparent electrode 140d are illustrated.

The upper transparent electrodes 140 are separated from each other in a range between about 1 μm to about 10 μm, and about 5 μm in exemplary embodiments. A width of the upper transparent electrodes 140 is in a range between about 1 μm to about 10 μm, and about 4 μm in exemplary embodiments.

Each upper transparent electrode 140 is formed of a transparent conductive material. An example of a material that may be used for the upper transparent electrode 140 may include indium tin oxide ("ITO"), indium zinc oxide ("IZO"), amorphous indium tin oxide ("a-ITO"), and so on. The upper transparent electrodes 140 are electrically connected to the power supply part (not shown) and an upper voltage is applied to the upper transparent electrodes 140.

The liquid crystal lens layer 150 is disposed between the upper and lower transparent substrates 110 and 120. The liquid crystal lens layer 150 includes liquid crystal molecules 152, each having a long granule-like shape, along one direction. The liquid crystal molecules 152 have an anisotropic refractive index, which changes according to an incident light direction. For example, the liquid crystal molecules 152 have a first refractive index with respect to the first direction, and a second refractive index with respect to the second direction perpendicular to the first direction. For example, the first refractive index is about 1.8, and the second refractive index is about 1.5.

In this case, lower voltages are applied to the lower transparent electrodes 130 and upper voltages are applied to the upper transparent electrodes 140, so that an electric field is generated between the lower and upper transparent electrodes 130 and 140. The electric field changes a longitudinal arrangement direction of the liquid crystal molecules 152 disposed between the lower and upper transparent substrates 110 and 120.

The stereoscopic image conversion panel 100 according to the first exemplary embodiment may further include a lower alignment film (not shown) and an upper alignment film (not shown). The lower alignment film is formed on the lower transparent substrate 110 to cover the lower transparent electrode 130. The upper alignment film is formed on the upper transparent substrate 120 to cover the upper transparent electrode 140.

In this case, when the electric field is not generated between the lower and upper transparent electrodes 130 and 140, the lower and upper alignment films determine the longitudinal arrangement direction of the liquid crystal molecules 152 in the liquid crystal lens layer 150. Particularly, the longitudinal arrangement direction of the liquid crystal molecules 152 is substantially parallel with the first direction with respect to the lower and upper transparent substrates 110 and 120 by the lower and upper alignment films. In this case, when a lower alignment groove formed on the lower alignment film and an upper alignment groove formed on the upper alignment film are perpendicular to each other, the longitudinal arrangement direction of the liquid crystal molecules 152 in the liquid crystal lens layer 150 may be twisted 90 degrees along an axis in an upward direction.

However, when the electric field is generated between the lower and upper transparent electrodes 130 and 140, the longitudinal arrangement direction of the liquid crystal molecules 152 in the liquid crystal lens layer 150 is along a direction of the electric field. For example, the liquid crystal molecules 152 may have positive characteristics, so that the longitudinal arrangement direction of the liquid crystal molecules 152 is along the direction of the electric field.

In contrast, when the electric field is not generated between the lower and upper transparent electrodes 130 and 140, the longitudinal arrangement direction of the liquid crystal molecules 152 in the liquid crystal lens layer 150 may be perpendicular to the lower and upper transparent substrates 110 and 120 by the lower and upper alignment films. When the electric field is generated between the lower and upper transparent electrodes 130 and 140, the longitudinal arrangement direction of the liquid crystal molecules 152 may be perpendicular to the direction of the electric field. For example, the liquid crystal molecules 152 may have negative characteristics, so that the longitudinal arrangement direction of the liquid crystal molecules 152 is perpendicular to the direction of the electric field.

The stereoscopic image conversion panel 100 according to the first exemplary embodiment will be explained more particularly, classifying into two cases with and without an electric field between the lower and upper transparent electrodes 130 and 140.

Referring to FIGS. 1 and 2 again, when the lower voltages are not applied to the lower transparent electrodes 130 and the upper voltages are not applied to the upper transparent electrodes 140, an electric field between the lower and upper transparent electrodes 130 and 140 is not generated. In this case, when an electric field is not generated, the longitudinal arrangement direction of the liquid crystal molecules 152 is along the first direction with respect to the lower and upper transparent substrates 110 and 120 caused by the lower and upper alignment films. For example, the longitudinal arrangement direction of the liquid crystal molecules 152 is 90 degrees with respect to the direction perpendicular to the first and second directions.

In this case, an incident light 10 incident into a lower portion of the stereoscopic image conversion panel 100 passes through the liquid crystal molecules 152, the longitudinal arrangement direction of which is along the first direction. Therefore, an exiting light 20 exiting from the stereoscopic image conversion panel 100 produces a flat 2-D image.

Figure 3:
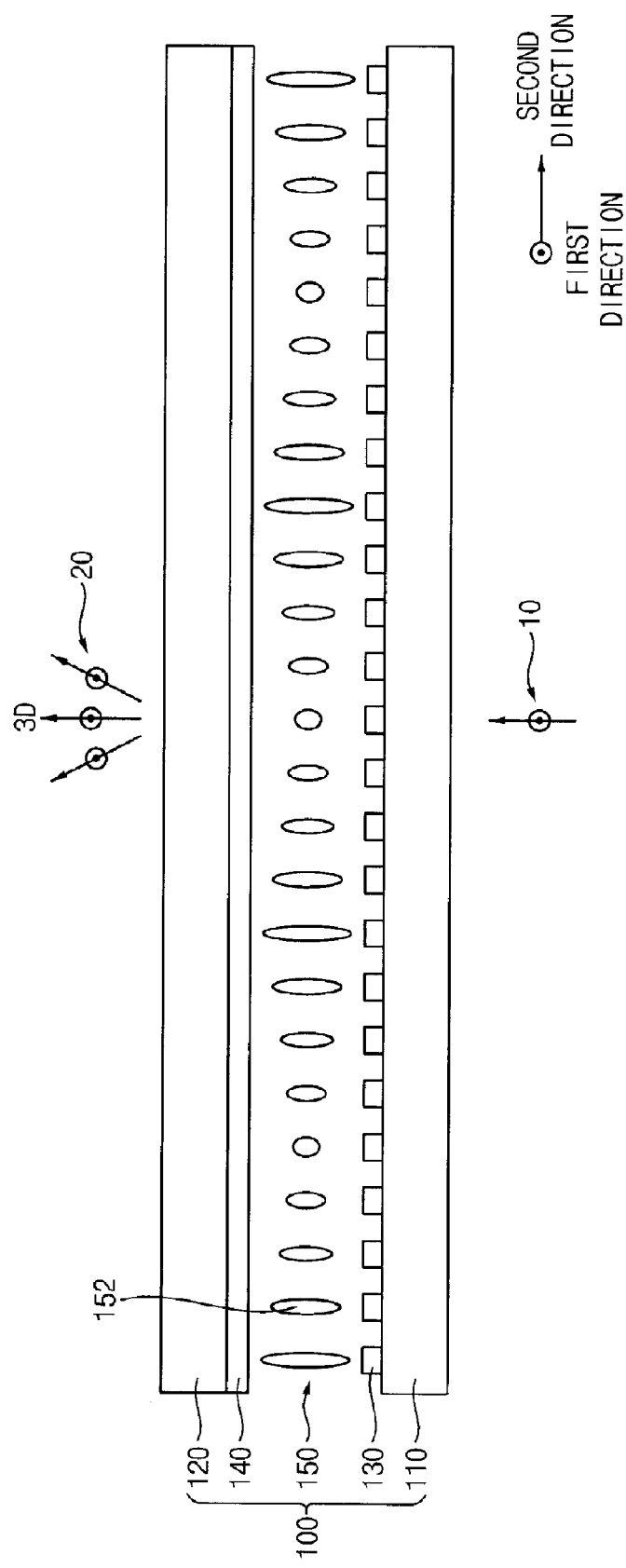
FIG. 3 is a cross-sectional view illustrating the stereoscopic image conversion panel when an electric field is generated in FIG. 1.
Figure 4:
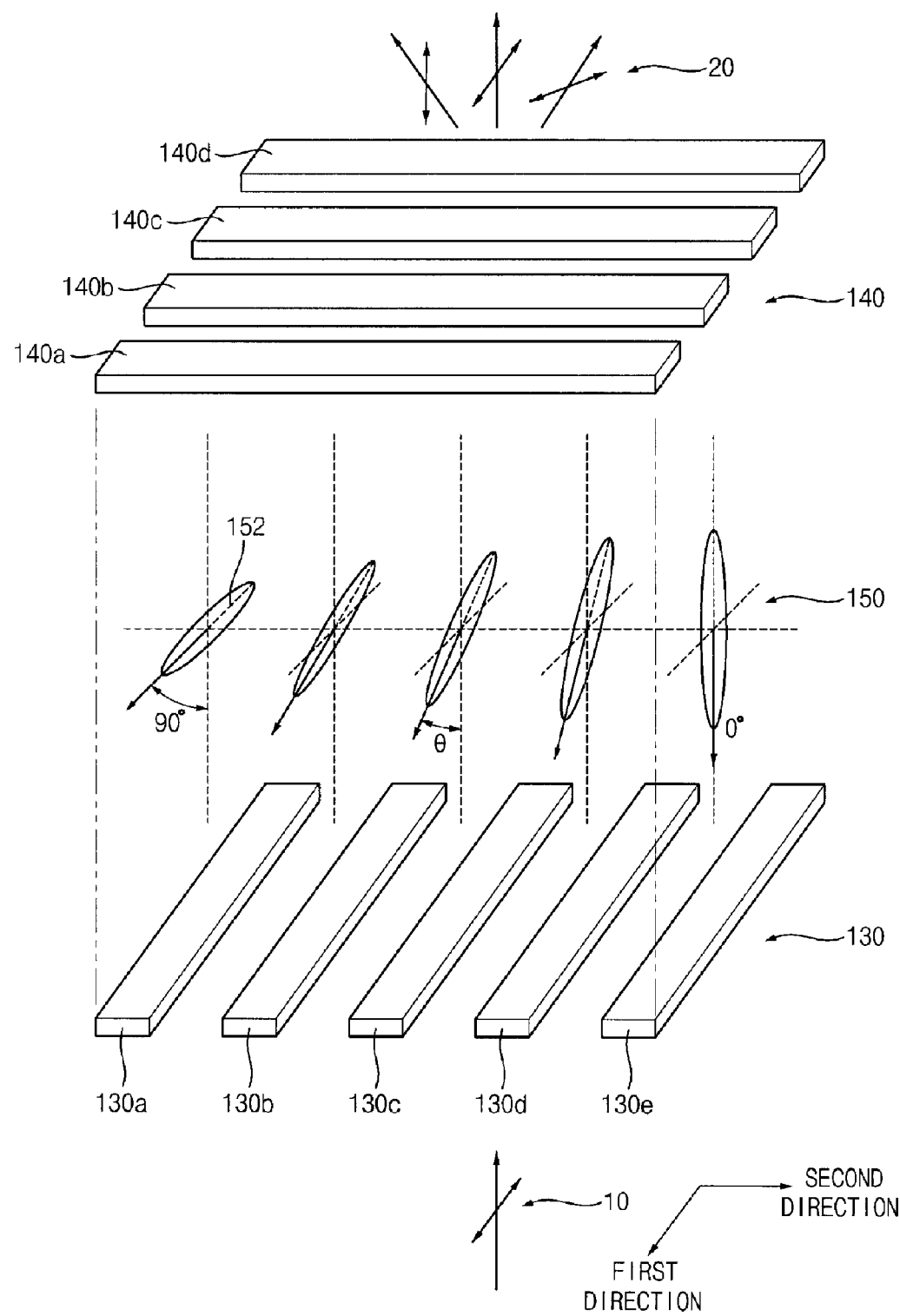
FIG. 4 is an enlarged perspective partial view illustrating the stereoscopic image conversion panel in FIG. 3.

FIG. 3 is a cross-sectional view illustrating the stereoscopic image conversion panel 100 of FIG. 1 when an electric field is generated, and FIG. 4 is an enlarged perspective partial view illustrating the stereoscopic image conversion panel in FIG. 3.

Referring to FIGS. 3 and 4, when the lower voltages are applied to the lower transparent electrodes 130 and the upper voltages are applied to the upper transparent electrodes 140, an electric field is generated between the lower and upper transparent electrodes 130 and 140. The longitudinal arrangement direction of the liquid crystal molecules 152 in the liquid crystal lens layer 150 is determined by the electric field.

In the exemplary embodiment, the lower voltages applied to the lower transparent electrodes 130 periodically fluctuate along the second direction. Preferably, the lower voltages nonlinearly increase along the second direction and decrease, periodically. However, substantially the same upper voltages are applied to the upper transparent electrodes 140.

More particularly, each voltage applied to the first, second, third, fourth and fifth lower transparent electrodes 130a, 130b, 130c, 130d and 130e, nonlinearly increases, respectively. For example, when a first lower voltage is applied to the first lower transparent electrode 130a, a second lower voltage is applied to the second lower transparent electrode 130b, a third lower voltage is applied to the third lower transparent electrode 130c, a fourth lower voltage is applied to the fourth lower transparent electrode 130d and a fifth lower voltage is applied to the fifth lower transparent electrode 130e, the fifth lower voltage is larger than the fourth lower voltage, the fourth lower voltage is larger than the third lower voltage, the third lower voltage is larger than the second lower voltage and the second lower voltage is larger than the first lower voltage.

Therefore, the lower voltages nonlinearly increase along the second direction and then nonlinearly decrease. For example, the lower voltages periodically fluctuate along the second direction in a range between about 0 V to about 10 V.

However, each of the first, second, third, fourth and fifth upper transparent electrodes 140a, 140b, 140c and 140d has substantially the same upper voltage. For example, each upper voltage is 0 V.

The lower voltages are applied to the lower transparent electrodes 130 and periodically fluctuate along the second direction. The upper voltages are applied to the upper transparent electrodes 140 and are substantially the same. Therefore, the periodic longitudinal arrangement direction of the liquid crystal molecules 152 is along the second direction.

An inclination angle θ of the longitudinal arrangement direction of the liquid crystal molecules 152 nonlinearly increases along the second direction and decreases, periodically. In this case, the inclination angle θ is defined as an inclined angle of the liquid crystal molecules 152 with respect to the direction perpendicular to both the first and second directions. For example, the inclination angle θ of the longitudinal arrangement direction of the liquid crystal molecules 152 repeatedly decreases and increases along the second direction in a range between about 90 degrees to about 0 degrees.

In this case, the incident light 10 incident into the lower portion of the stereoscopic image conversion panel 100 is refracted by the liquid crystal molecules 152, the longitudinal arrangement direction of which periodically fluctuates along the second direction. Therefore, the exiting light 20 exiting from the stereoscopic image conversion panel 100 produces a stereoscopic image.

Figure 5:
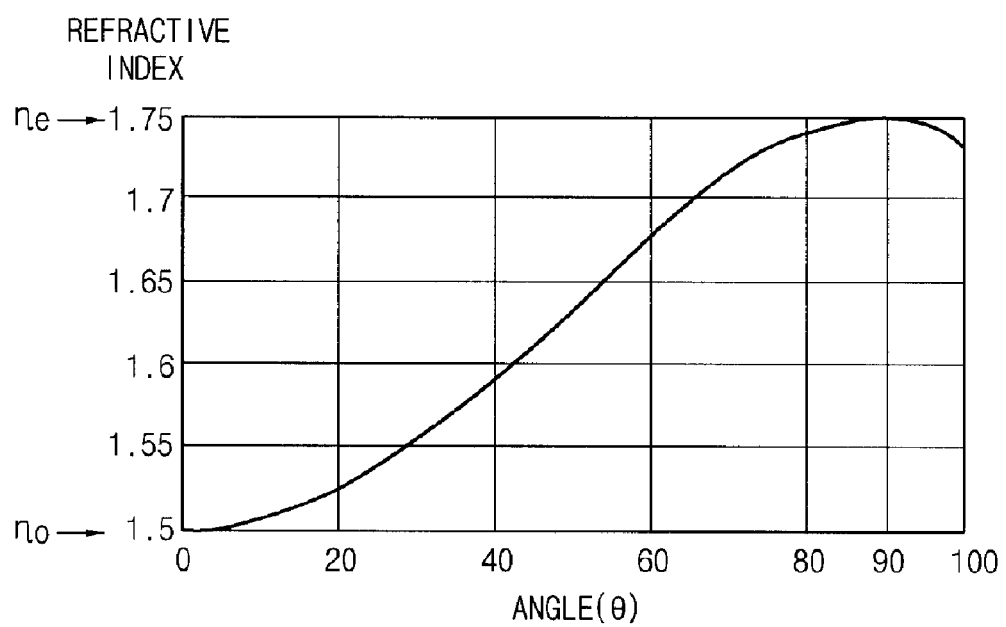
FIG. 5 is a graph showing a variation of a refractive index according to an inclination angle of a longitudinal arrangement direction of liquid crystal molecules in FIGS. 1 and 3.

FIG. 5 is a graph showing a variation of refractive index according to an inclination angle of the longitudinal arrangement direction of liquid crystal molecules in FIGS. 1 and 3.

Referring to FIG. 5, the liquid crystal molecules 152 of the liquid crystal lens layer 150 have a refractive index which changes according to the inclination angle θ with respect to the direction perpendicular to the first and second directions. In this case, the refractive index of the liquid crystal molecules 152 is on the incident light 10 incident into the lower portion of the stereoscopic image conversion panel 100, and the incident light 10 is, for example, a light polarized to have the second direction. Particularly, as the inclination angle θ of the longitudinal arrangement direction of the liquid crystal molecules 152 increases from about 0 degrees up to about 90 degrees, the refractive index nonlinearly increases from about 1.5 up to about 1.8.

Figure 6:
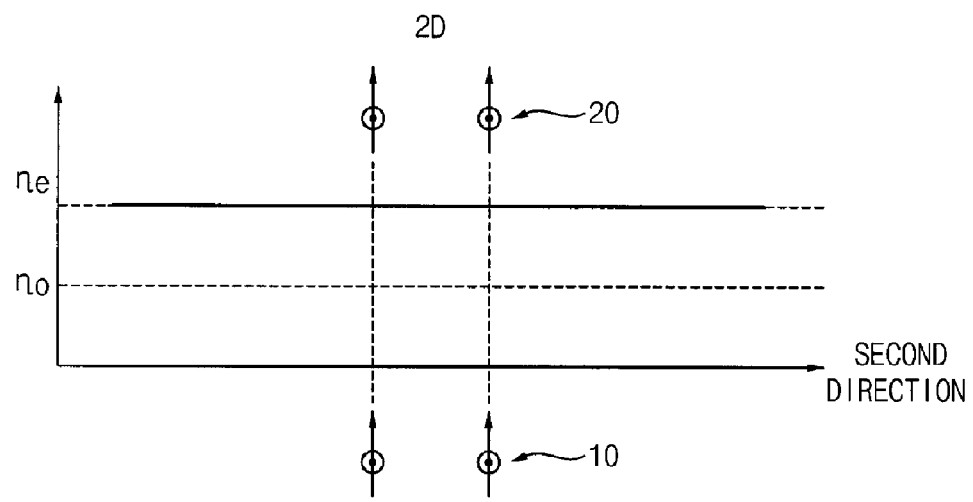
FIG. 6 is a graph showing a variation of a refractive index according to a position of liquid crystal molecules in the stereoscopic image conversion panel of FIG. 1.

FIG. 6 is a graph showing a variation of refractive index according to a position of liquid crystal molecules in the stereoscopic image conversion panel of FIG. 1.

Referring to FIGS. 2 and 6, when the electric field is not generated between the lower and upper transparent electrodes 130 and 140, the refractive index of the liquid crystal molecules 152 is about 1.8, since the inclination angle θ of the longitudinal arrangement direction of the liquid crystal molecules 152 is about 90 degrees.

Therefore, the incident light 10 incident into the lower portion of the stereoscopic image conversion panel 100 is not refracted by the liquid crystal molecules 152 having substantially the same refractive index and passes therethrough in order to produce the flat 2-D image.

Figure 7:
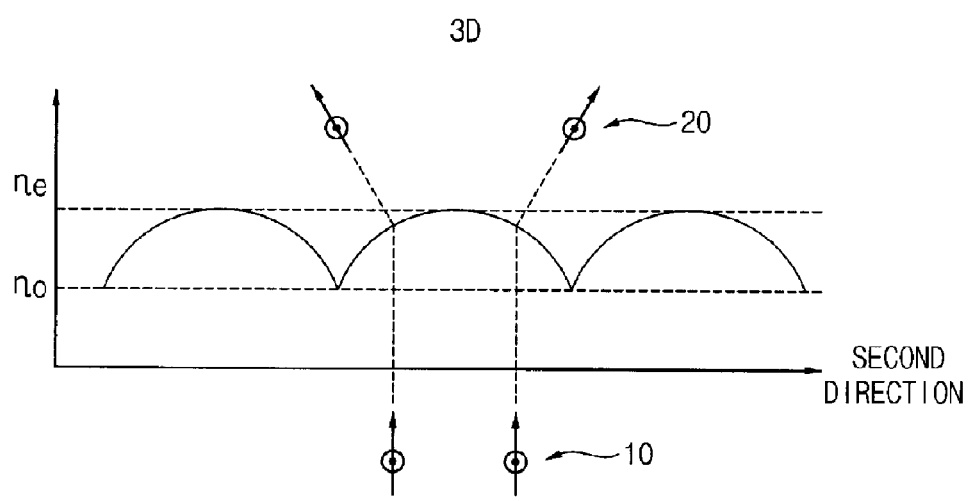
FIG. 7 is a graph showing a variation of a refractive index according to a position of liquid crystal molecules in the stereoscopic image conversion panel of FIG. 3.

FIG. 7 is a graph showing a variation of refractive index according to a position of liquid crystal molecules in the stereoscopic image conversion panel of FIG. 3.

Referring to FIGS. 4 and 7, when an electric field is generated between the lower and upper transparent electrodes 130 and 140, the refractive index of the liquid crystal molecules 152 repeatedly fluctuates along the second direction in a range of between about 1.5 to about 1.8, since the inclination angle θ of the longitudinal arrangement direction of the liquid crystal molecules 152 periodically fluctuates along the second direction, as well. Particularly, the refractive angle of the liquid crystal molecules 152 repeated fluctuates along the second direction to have a half-cylindrical shape. In this case, the refractive index of the liquid crystal molecules 152 means the refractive index to which the incident light 10 is polarized in the first direction.

Therefore, the incident light 10 incident into the lower portion of the stereoscopic image conversion panel 100 is refracted by the liquid crystal molecules 152 having the refractive index periodically fluctuating, in order to produce a stereoscopic image.

According to the exemplary embodiment, the periodic longitudinal arrangement direction of the liquid crystal molecules 152 in the liquid crystal lens layer 150 may be along the second direction, since the lower voltages periodically fluctuating along the second direction are applied to the lower transparent electrodes 130 and substantially the same upper voltages are applied to the upper transparent electrodes 140. Therefore, the refractive index of the liquid crystal molecules 152 periodically changed along the second direction, and thus the incident light 10 is refracted in the liquid crystal lens layer 150 to produce the stereoscopic image.

In addition, since the stereoscopic image conversion panel 100 according to the exemplary embodiment does not include a conventional time-delay barrier which partially blocks the incident light 10, the brightness of the stereoscopic image conversion panel 100 may be increased.

In addition, since the stereoscopic image conversion panel 100 according to the exemplary embodiment does not include a conventional concave lens which is used to refract the incident light 10, forming the alignment groove on the alignment film may be easier.

Furthermore, since the stereoscopic image conversion panel 100 according to the exemplary embodiment forms an imaginary lens by changing the longitudinal arrangement direction of the liquid crystal molecules 152, an extra element such as a lens may not be required, and thus the thickness of the stereoscopic image conversion panel 100 and cost of manufacturing the stereoscopic image conversion panel 100 may be reduced.

Example Embodiment 2

Stereoscopic Image Conversion Panel

Figure 8:
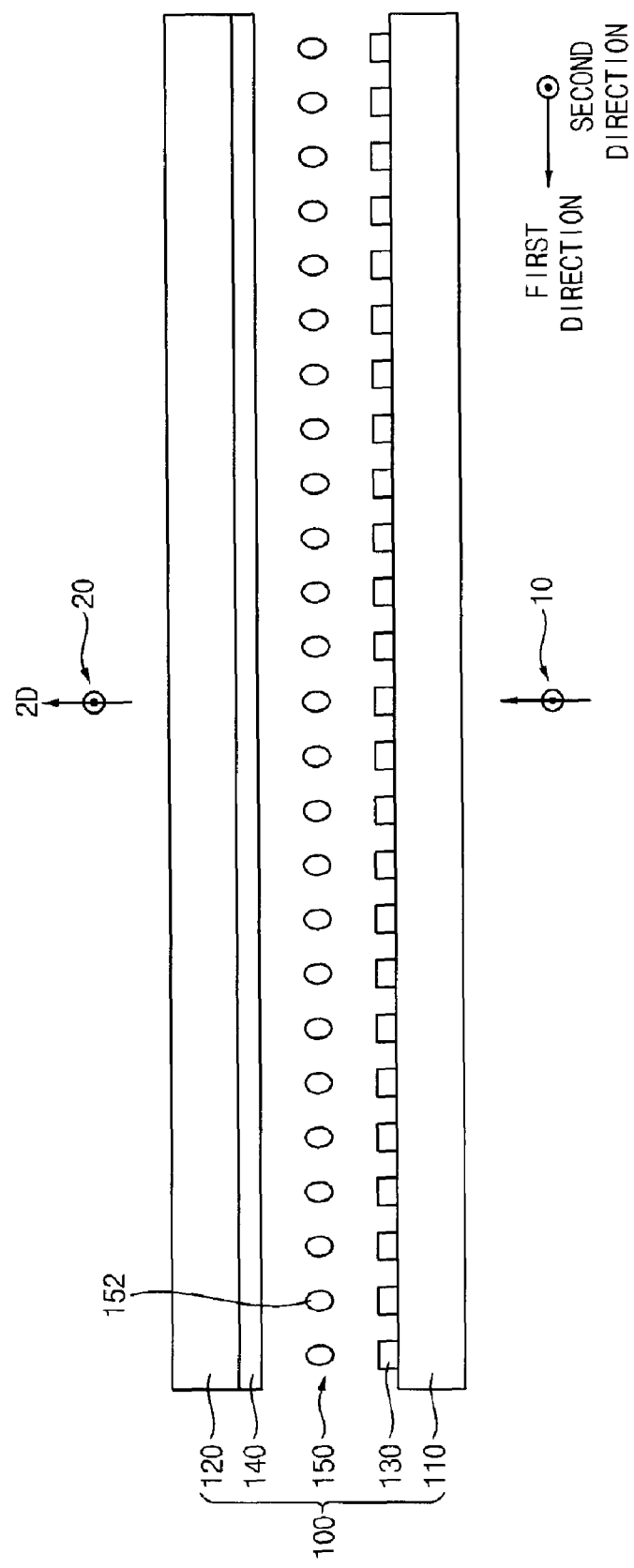
FIG. 8 is a cross-sectional view illustrating a stereoscopic image conversion panel according to a second exemplary embodiment of the present invention.
Figure 9:
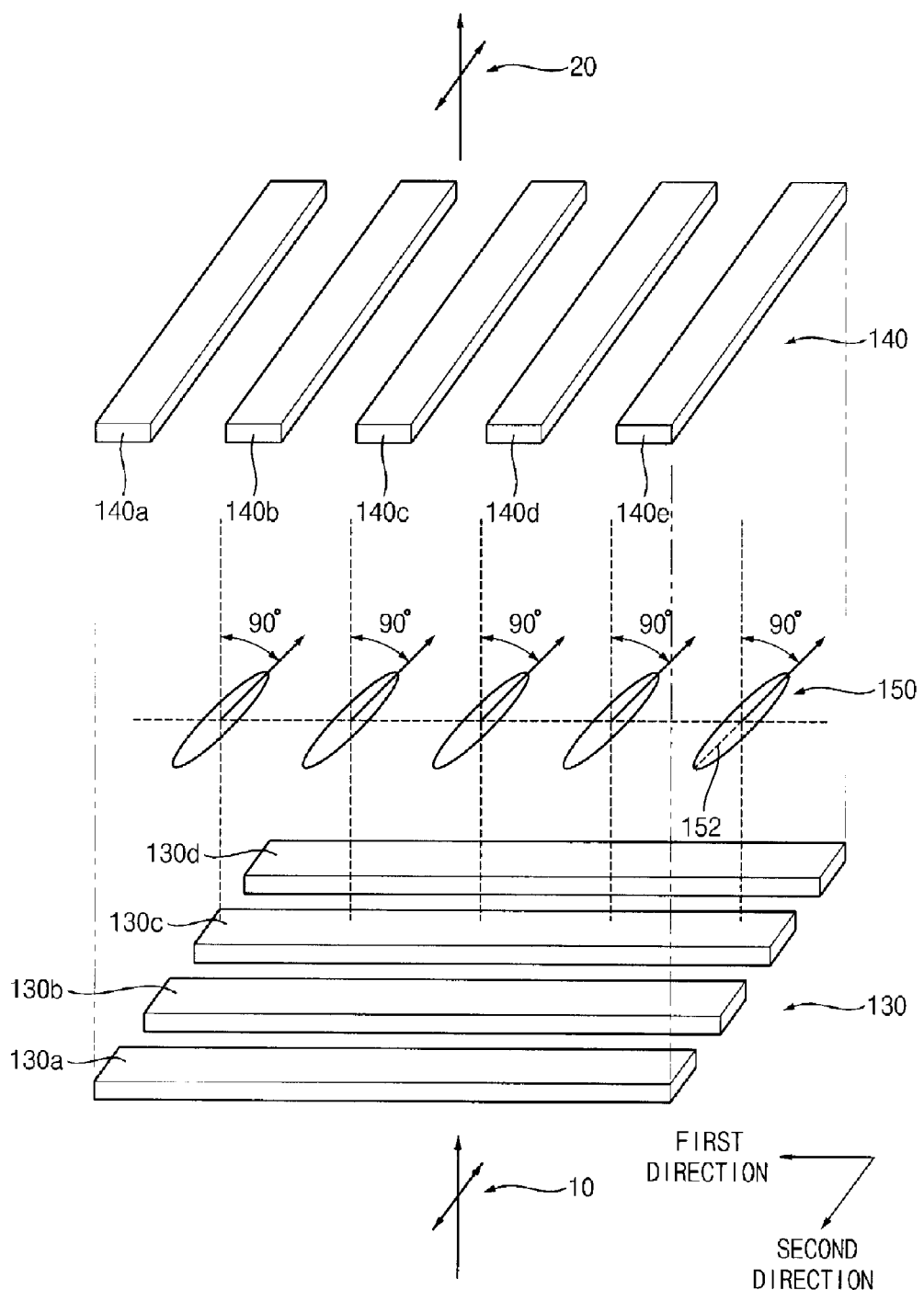
FIG. 9 is an enlarged perspective partial view illustrating the stereoscopic image conversion panel in FIG. 8.

FIG. 8 is a cross-sectional view illustrating a stereoscopic image conversion panel according to a second exemplary embodiment of the present invention, and FIG. 9 is an enlarged perspective partial view illustrating the stereoscopic image conversion panel in FIG. 8.

Referring to FIGS. 8 and 9, the stereoscopic image conversion panel 100 according to the exemplary embodiment includes a lower transparent substrate 110, an upper transparent substrate 120, lower transparent electrodes 130, upper transparent electrodes 140, a liquid crystal lens layer 150, an upper alignment film (not shown) and a lower alignment film (not shown).

The lower and upper transparent substrates 110 and 120 have a plate-like shape, are formed of a transparent material and are disposed facing each other.

The lower transparent electrodes 130 are formed on the lower transparent substrate 110 facing the upper transparent substrate 120. The lower transparent electrodes 130 are formed lengthwise along a first direction, and are formed substantially in parallel with each other along a second direction perpendicular to the first direction. For example referring to FIG. 9, a first lower transparent electrode 130a, a second lower transparent electrode 130b, a third lower transparent electrode 130c, a fourth lower transparent electrode 130d and a fifth lower transparent electrode 130e are illustrated. The lower transparent electrodes 130 are formed of a transparent conductive material and are electrically connected to a power supply (not shown), so that lower voltages are applied to the lower transparent electrodes 130.

The upper transparent electrodes 140 are formed on the upper transparent substrate 120 facing the lower transparent substrate 110. The upper transparent electrodes 140 are formed lengthwise along the second direction to cross the lower transparent electrodes 130, and are formed substantially in parallel with each other along the first direction. For example referring to FIG. 9, a first upper transparent electrode 140a, a second upper transparent electrode 140b, a third upper transparent electrode 140c, a fourth upper transparent electrode 140d and a fifth upper transparent electrode 140e are illustrated. The upper transparent electrodes 140 are formed of a transparent conductive material and are electrically connected to the power supply (not shown), so that upper voltages are applied to the upper transparent electrodes 140.

The liquid crystal lens layer 150 is disposed between the upper and lower transparent substrates 110 and 120. The liquid crystal lens layer 150 includes the liquid crystal molecules 152, each having a long granule-like shape, along one direction. The liquid crystal molecules 152 have an anisotropic refractive index, which changes according to a direction of incident light.

In this case, when the lower voltages are applied to the lower transparent electrodes 130 and the upper voltages are applied to the upper transparent electrodes 140, an electric field is generated between the lower and upper transparent electrodes 130 and 140 which change a longitudinal arrangement direction of the liquid crystal molecules 152.

The lower alignment film (not shown) is formed on the lower transparent substrate 110 to cover the lower transparent electrode 130. The upper alignment film (not shown) is formed on the upper transparent substrate 120 to cover the upper transparent electrode 140. When the electric field is not generated between the lower and upper transparent electrodes 130 and 140, the lower and upper alignment films (both not shown) align the longitudinal arrangement direction of the liquid crystal molecules 152 substantially in parallel with the lower and upper transparent substrates 110 and 120. For example, the longitudinal arrangement direction of the liquid crystal molecules 152 in the liquid crystal lens layer 150 is along the second direction.

In contrast, when an electric field is not generated, the lower and upper alignment films may align the longitudinal arrangement direction of the liquid crystal molecules 152 perpendicular to the lower and upper transparent substrates 110 and 120.

The stereoscopic image conversion panel 100 according to the exemplary embodiment will be explained particularly, classifying into two cases with and without an electric field between the lower and upper transparent electrodes 130 and 140.

Referring to FIGS. 8 and 9 again, when the lower voltages are not applied to the lower transparent electrodes 130 and the upper voltages are not applied to the upper transparent electrodes 140, an electric field is not generated between the lower and upper transparent electrodes 130 and 140. Therefore, the longitudinal arrangement direction of the liquid crystal molecules 152 is along the second direction with respect to the lower and upper transparent substrates 110 and 120 caused by the lower and upper alignment films.

In this case, an incident light 10 incident into a lower portion of the stereoscopic image conversion panel 100 passes through the liquid crystal molecules 152, the longitudinal arrangement direction of which is along the second direction, and thus an exiting light 20 exiting from the stereoscopic image conversion panel 100 produces a flat 2-D image.

Figure 10:
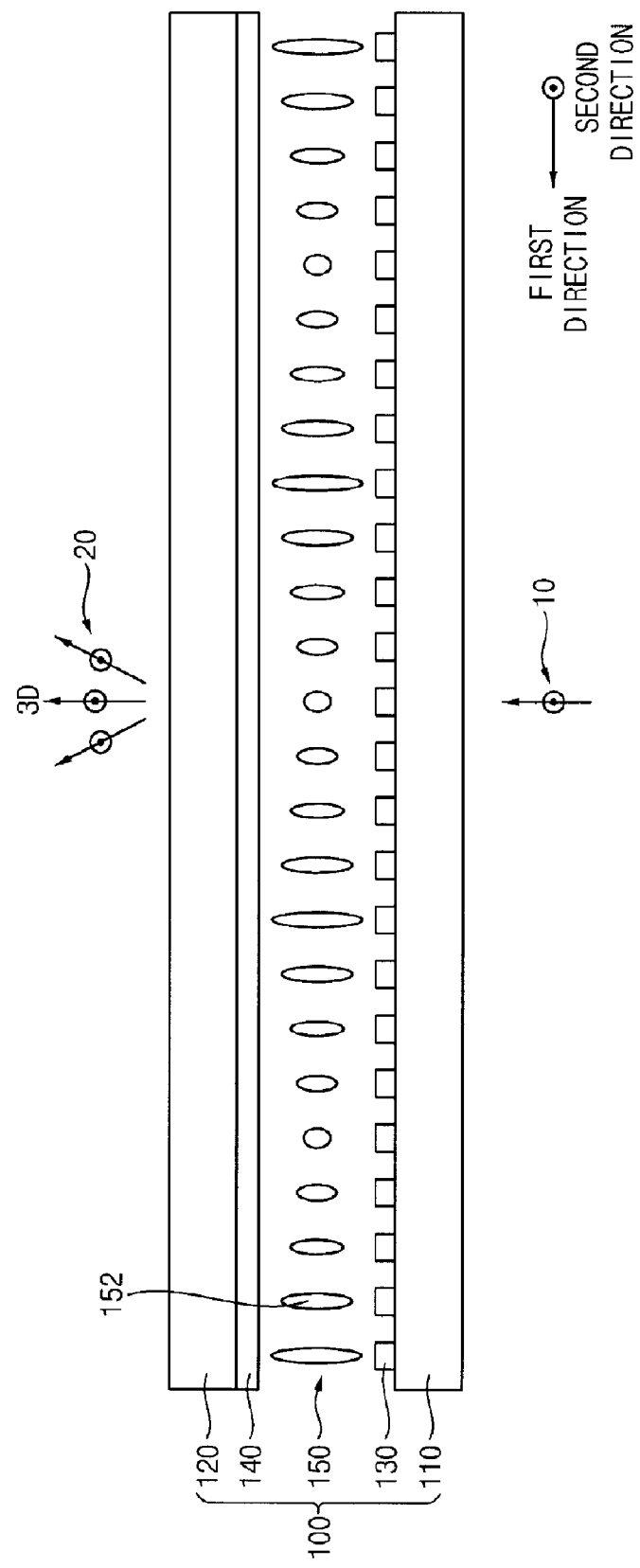
FIG. 10 is a cross-sectional view illustrating the stereoscopic image conversion panel when an electric field is generated in FIG. 8.
Figure 11:
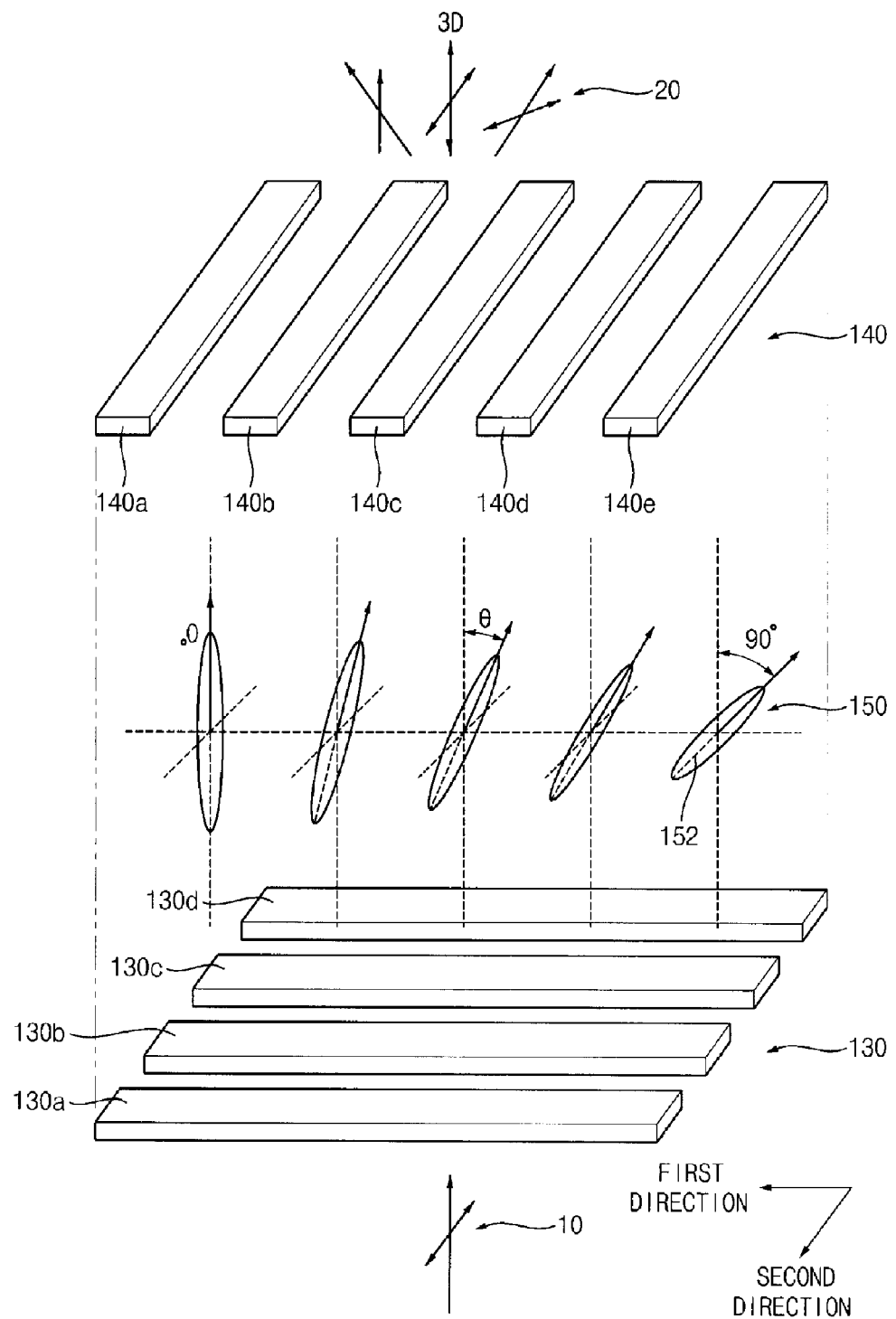
FIG. 11 is an enlarged perspective partial view illustrating the stereoscopic image conversion panel in FIG. 10.

FIG. 10 is a cross-sectional view illustrating the stereoscopic image conversion panel when an electric field is generated in FIG. 8, and FIG. 11 is an enlarged perspective partial view illustrating the stereoscopic image conversion panel in FIG. 10.

Referring to FIGS. 10 and 11, when lower voltages are applied to the lower transparent electrodes 130 and upper voltages are applied to the upper transparent electrodes 140, an electric field is generated between the lower and upper transparent electrodes 130 and 140. Therefore, the electric field changes the longitudinal arrangement direction of the liquid crystal molecules 152 of the liquid crystal lens layer 150.

In the exemplary embodiment, upper voltages applied to the upper transparent electrodes 140 periodically fluctuate along the first direction. Preferably, the upper voltages nonlinearly increase along the first direction and decrease, periodically. However, lower voltages applied to the lower transparent electrodes 130 are substantially the same.

For example, each voltage applied to the first, second, third, fourth and fifth upper transparent electrodes 140a, 140b, 140c, 140d and 140e, nonlinearly decreases, respectively. For example, when a first upper voltage is applied to the first upper transparent electrode 140a, a second upper voltage is applied to the second upper transparent electrode 140b, a third upper voltage is applied to the third upper transparent electrode 140c, a fourth upper voltage is applied to the fourth upper transparent electrode 140d and a fifth voltage is applied to the fifth upper transparent electrode 140e, the first upper voltage is larger than the second upper voltage, the second upper voltage is larger than the third upper voltage, the third upper voltage is larger than the fourth upper voltage and the fourth upper voltage is larger than the fifth upper voltage.

Therefore, the upper voltages nonlinearly increase along the first direction and then decrease. For example, the upper voltages periodically fluctuate along the first direction in a range between about 0 V to about 10 V.

However, each of the first, second, third, fourth and fifth lower transparent electrodes 130a, 130b, 130c and 130d has substantially the same lower voltage. For example, each lower voltage is 0 V.

Since the upper voltages periodically fluctuating along the first direction are applied to the upper transparent electrodes 140 and substantially the same lower voltages are applied to the lower transparent electrodes 130, the periodic longitudinal arrangement direction of the liquid crystal molecules 152 is along the first direction.

Particularly, an inclination angle θ of the longitudinal arrangement direction of the liquid crystal molecules 152 nonlinearly increases along the second direction and decreases, periodically. Preferably, the inclination angle θ of the longitudinal arrangement direction of the liquid crystal molecules 152 repeatedly decreases along the first direction in a range between about 90 degrees and about 0 degrees and then increases. Therefore, since the inclination angle θ of the longitudinal arrangement direction of the liquid crystal molecules 152 periodically fluctuates along the first direction, a refractive index of the liquid crystal molecules 152 repeatedly fluctuates along the first direction having a half-elliptical shape.

Therefore, the incident light 10 incident into the lower portion of the stereoscopic image conversion panel 100 is refracted by the liquid crystal molecules 152 having a refractive index periodically fluctuating along the first direction, so that the exiting light 20 exiting from the stereoscopic image conversion panel 100 produces a stereoscopic 3-D image.

Example Embodiment 3

Stereoscopic Image Display Apparatus

Figure 12:
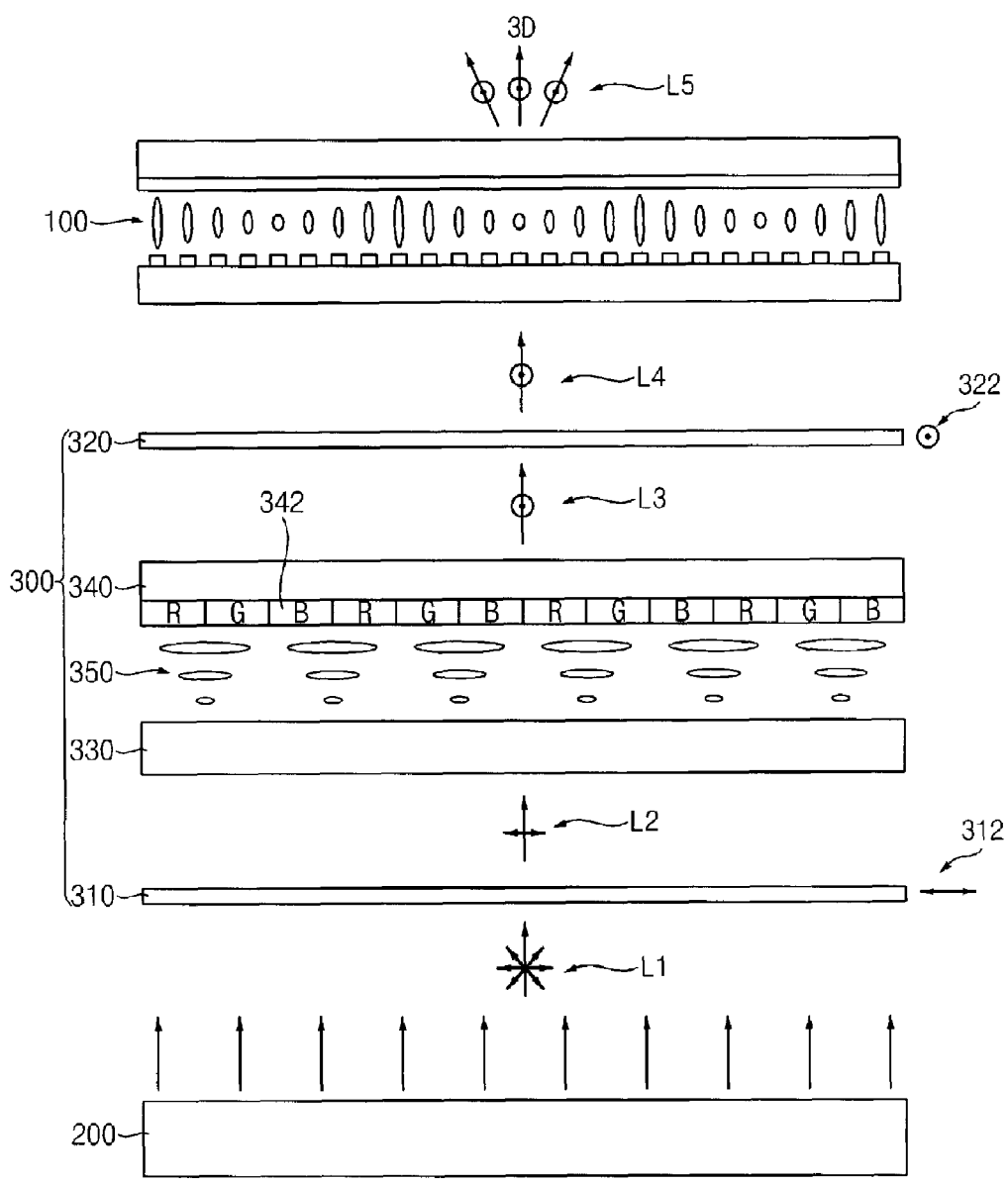
FIG. 12 is a cross-sectional view illustrating a stereoscopic image display apparatus according to a third exemplary embodiment of the present invention.

FIG. 12 is a cross-sectional view illustrating a stereoscopic image display apparatus according to a third exemplary embodiment of the present invention. The stereoscopic image conversion panel in the stereoscopic image display apparatus of this exemplary embodiment is substantially the same as Example Embodiment 1 or Example Embodiment 2 of the stereoscopic image conversion panels. Thus, the same reference numerals will be used to refer to the same or like parts as those described in Example Embodiment 1 or Example Embodiment 2 of the stereoscopic image conversion panels and any further repetitive explanation concerning the above elements will be omitted.

Referring to FIG. 12, the stereoscopic image display apparatus according to this exemplary embodiment includes a backlight assembly 200, a display panel assembly 300 and a stereoscopic image conversion panel 100.

The backlight assembly 200 includes a light source (not shown) emitting a first light L1. The display panel assembly 300 is disposed over the backlight assembly 200, and displays a flat image using the first light L1. The stereoscopic image conversion panel 100, disposed over the display panel assembly 300, selectively converts a flat image from the display panel assembly 300 into a stereoscopic image, and emits the flat image or the stereoscopic image.

For example, the display panel assembly 300 includes a first polarizing plate 310, a second polarizing plate 320 and a display panel. The display panel includes a first substrate 330, a second substrate 340 and a liquid crystal layer 350 disposed therebetween.

The first polarizing plate 310 includes a first polarizing axis 312. The first polarizing plate 310 is disposed over the backlight assembly 200, and converts the first light L1 into a second light L2 which is polarized substantially in parallel with the first polarizing axis 312. The second polarizing plate 320 is disposed facing the first polarizing plate 310, and has a second polarizing axis 322 perpendicular to the first polarizing axis 312.

The first substrate 330 is disposed between the first and second polarizing plates 310 and 320. The first substrate 330 includes a plurality of pixel electrodes (not shown) disposed in a matrix shape, a plurality of thin-film transistors (not shown) applying a driving voltage to each pixel electrode, and a plurality of signal lines (not shown) driving each thin-film transistor of the plurality of thin-film transistors (not shown).

The second substrate 340 is disposed between the first substrate 330 and the second polarizing plate 320 facing the first substrate 330. The second substrate 340 includes a common electrode (not shown) and color filters 342. The common electrode formed on the whole second substrate 340 is transparent and conductive. The color filters 342 are formed facing the pixel electrodes which are on the first substrate 330. The color filters 342 include a red color filter (R), a green color filter (G) and a blue color filter (B), for example, but are not limited thereto.

The liquid crystal layer 350 is disposed between the first and second substrates 330 and 340, and liquid crystals of liquid crystal layer 350 are rearranged by an electric field generated between the pixel electrodes and the common electrode. The rearranged liquid crystal layer 350 controls the transmissivity of light applied from an external source (i.e., a light source (not shown) of the backlight assembly 200). An image is displayed when the light having the predetermined transmissivity passes through the color filters 342. For example, when an electric field is not generated, the liquid crystal layer 350 is twisted 90 degrees along an axis in an upward direction.

In this case, when an electric field is not generated between the substrates 330 and 340, the display panel assembly 300 is in a normally white mode displaying a white image.

A process in which the stereoscopic image display apparatus selectively displays the stereoscopic image is now described as follows. First, the first light L1 emitted by the backlight assembly 200 passes through the first polarizing plate 310 to be converted into the second light L2 polarized substantially in parallel with the first polarizing axis 312. The second light L2 rotates 90 degrees when passing through the liquid crystal layer 350 disposed between the first and second substrates 330 and 340, to be converted into a third light L3. Since the third light L3 is polarized to have substantially the same direction as the second polarizing axis 350, the third light L3 passes through the second polarizing plate 320 to be converted into a fourth light L4. In this case, the fourth light L4 produces a flat 2-D image.

The fourth light L4 is refracted by or passes through the stereoscopic image conversion panel 100. When the fourth light L4 is refracted by the stereoscopic image conversion panel 100, the fourth light L4 is converted into a fifth light L5 producing a stereoscopic 3-D image. However, when the fourth light L4 passes through the stereoscopic image conversion panel 100 without a generated electric field, the fourth light L4 produces the flat 2-D image.

Figure 13:
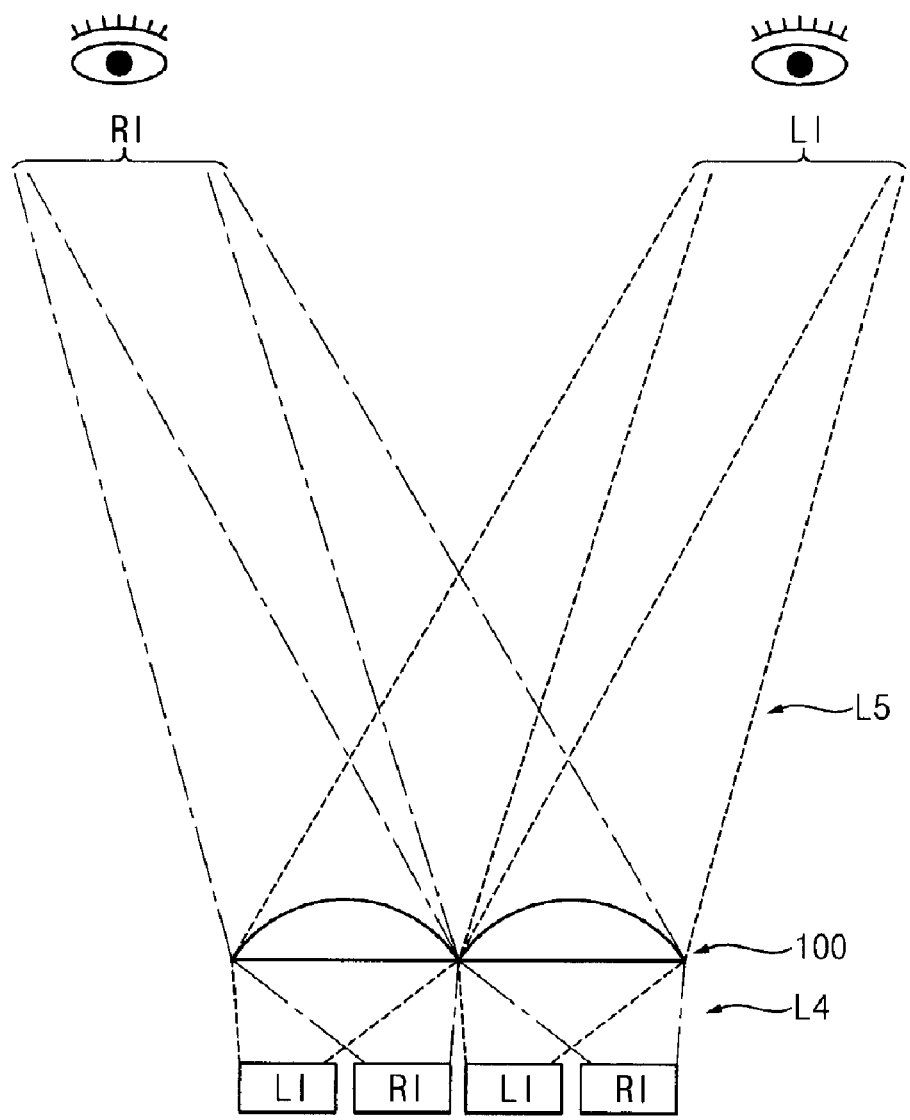
FIG. 13 is a conceptual view explaining a concept of producing a stereoscopic image by the stereoscopic image display apparatus in FIG. 10.

FIG. 13 is a conceptual view explaining a concept of producing a stereoscopic image by the stereoscopic image display apparatus in FIG. 10.

Referring to FIG. 13, the concept for the stereoscopic image display apparatus to produce a stereoscopic image L5 is explained as follows.

A flat image L4 emitted by the display panel assembly 300 (see FIG. 12) includes a plurality of left images LI and a plurality of right images RI. Each of the left images LI and each of the right images RI are sequentially and alternately arranged.

Each of the left images LI is refracted by the stereoscopic image conversion panel 100 and is applied to a viewer's left eye, and each right image RI is refracted by the stereoscopic image conversion panel 100 and is applied to the viewer's right eye. Therefore, the viewer may see the left images LI and the right images RI different from each other, so that the viewer's brain may sense a three-dimensional effect due to the merging of the left and right images LI and RI.

According to the present invention, since voltages periodically fluctuating along a direction are applied to one of the lower and upper transparent electrodes and substantially the same voltages are applied to the other, a periodic longitudinal arrangement direction of liquid crystal molecules in the liquid crystal lens layer may be along the direction. Therefore, the refractive index of the liquid crystal molecules periodically changes along the direction, and the light incident into the stereoscopic image conversion panel is refracted in the liquid crystal lens layer, so that the stereoscopic image may be produced and a viewing angle may be increased.

In addition, since the stereoscopic image conversion panel does not include the conventional time-delay barrier or the conventional concave lens, the brightness of the stereoscopic image conversion panel may be increased and forming the alignment groove on the alignment film may be easier. Therefore, the display quality of the stereoscopic image produced by the stereoscopic image display apparatus may be enhanced.

Furthermore, since the stereoscopic image conversion forms an imaginary lens by changing the longitudinal arrangement direction of liquid crystal molecules, a separate element such as lens may not be required, and thus the thickness of the stereoscopic image conversion panel and costs of manufacturing the stereoscopic image conversion panel may be reduced.

Having described the exemplary embodiments of the present invention and its aspects, features and advantages, it is noted that various changes, substitutions, modifications and alterations can be made herein without departing from the spirit and scope of the present invention as defined by the appended claims.

What is claimed is:

1. A stereoscopic image conversion panel comprising:
a first transparent substrate;
a second transparent substrate facing the first transparent substrate;
a first transparent electrode disposed on the first transparent substrate facing the second transparent substrate, the first transparent electrode including a plurality of first sub electrodes formed along a first direction and arranged substantially in parallel with each other along a second direction substantially perpendicular to the first direction;
a second transparent electrode disposed on the second transparent substrate facing the first transparent substrate; and
a liquid crystal lens layer disposed between the first and second transparent substrates, the liquid crystal lens layer including liquid crystal molecules having an anisotropic refractive index, and a longitudinal arrangement direction of liquid crystal molecules being changed by an electric field generated between the first and second transparent electrodes, the electric field changing the refractive index according to a position of the liquid crystal molecules,
wherein first voltages which periodically fluctuate along the second direction are applied to the first transparent electrode, and substantially same second voltages are applied to the second transparent electrode, so that an inclination angle of the longitudinal arrangement direction of the liquid crystal molecules periodically changes along the second direction.

2. The stereoscopic image conversion panel of claim 1, wherein the second transparent electrode includes a plurality of second sub electrodes formed along the second direction and arranged substantially in parallel with each other along the first direction.

3. The stereoscopic image conversion panel of claim 1, wherein the first sub electrodes are separated from each other in a range between about 1 μm to 10 μm.

4. The stereoscopic image conversion panel of claim 1, wherein each of the first sub electrodes has a width in a range between about 1 μm to 10 μm.

5. The stereoscopic image conversion panel of claim 1, wherein the first voltages nonlinearly change along the second direction.

6. The stereoscopic image conversion panel of claim 5, wherein an inclination angle of the longitudinal arrangement direction of liquid crystal molecules with respect to the first and second transparent substrates, periodically fluctuates along the second direction in a range between about 0 degrees to about 90 degrees.

7. The stereoscopic image conversion panel of claim 6, wherein the refractive index of the liquid crystal molecules with respect to a light polarized to have a predetermined direction, periodically fluctuates in a range between about 1.5 to about 1.8.

8. The stereoscopic image conversion panel of claim 5, wherein the first voltages periodically fluctuate along the second direction in a range between about 0 V to about 10 V.

9. The stereoscopic image conversion panel of claim 1, wherein the longitudinal arrangement direction of liquid crystal molecules is substantially parallel with the first and second transparent substrates when an electric field is not generated, and the longitudinal arrangement direction of liquid crystal molecules is substantially parallel with a direction of the electric field when the electric field is generated.

10. The stereoscopic image conversion panel of claim 1, wherein the longitudinal arrangement direction of liquid crystal molecules is substantially perpendicular to the first and second transparent substrates when an electric field is not generated, and the longitudinal arrangement direction of liquid crystal molecules is substantially perpendicular to the direction of the electric field when the electric field is generated.

11. The stereoscopic image conversion panel of claim 1, wherein the liquid crystal molecules of the liquid crystal lens layer are arranged symmetrically in a period in the second direction.

12. A stereoscopic image display apparatus comprising:
a backlight assembly emitting light;
a display panel assembly, disposed over the backlight assembly, for displaying a flat image using the light; and
a stereoscopic image conversion panel disposed over the display panel assembly, the stereoscopic image conversion panel including:
  a first transparent substrate;
  a second transparent substrate facing the first transparent substrate;
  a first transparent electrode disposed on the first transparent substrate facing the second transparent substrate, the first transparent electrode including a plurality of first sub electrodes formed along a first direction and arranged substantially in parallel with each other along a second direction substantially perpendicular to the first direction;
  a second transparent electrode disposed on the second transparent substrate facing the first transparent substrate; and
  a liquid crystal lens layer disposed between the first and second transparent substrates, the liquid crystal lens layer including liquid crystal molecules having an anisotropic refractive index, and a longitudinal arrangement direction of liquid crystal molecules being changed by an electric field generated between the first and second transparent electrodes, the electric field changing the refractive index according to a position of the liquid crystal molecules,
wherein first voltages which periodically fluctuate along the second direction are applied to the first transparent electrode, and substantially same second voltages are applied to the second transparent electrode, so that an inclination angle of the longitudinal arrangement direction of the liquid crystal molecules periodically changes along the second direction.

13. The stereoscopic image display apparatus of claim 12, wherein the display panel assembly includes:
a first polarizing plate and a second polarizing plate, each having a polarizing axis perpendicular to each other; and
a liquid crystal display panel disposed between the first and second polarizing plates, the liquid crystal display panel for displaying the flat image using a light transmissivity of the liquid crystal molecules.

* * * * *